Figures 1, 2:
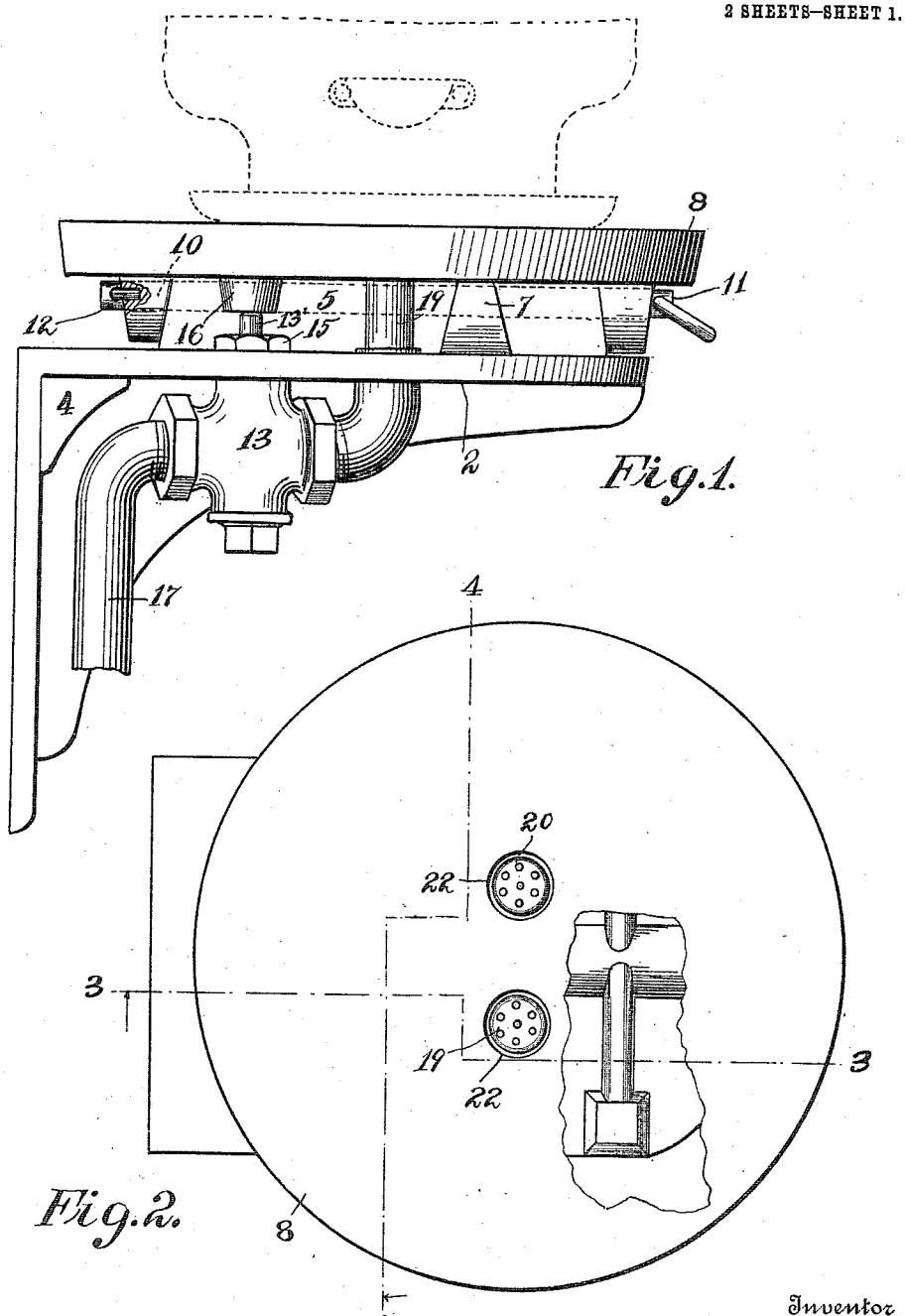

B. W. BEACH.
COMBINED RINSER AND STERILIZER.
APPLICATION FILED JUNE 10, 1910.

972,746.

Patented Oct. 11, 1910.

2 SHEETS—SHEET 1.

Witnesses
Thos. F. Knox,

Inventor
Benjamin W. Beach
By Victor J. Evans
Attorney

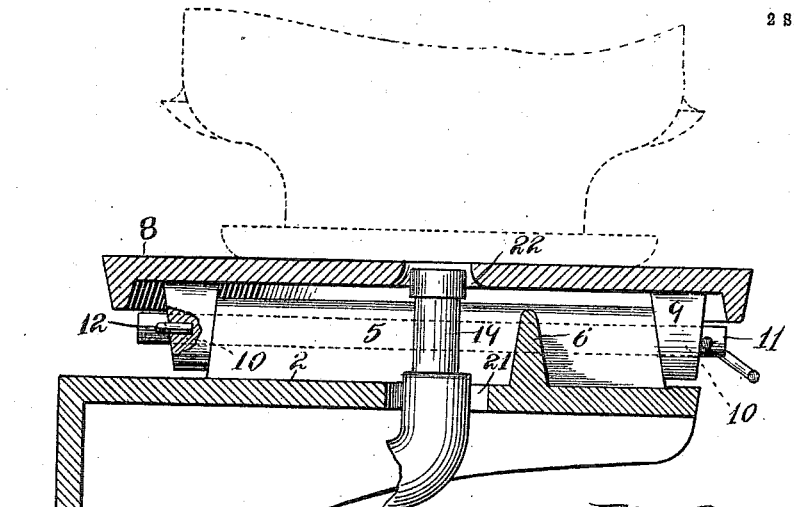

UNITED STATES PATENT OFFICE.

BENJAMIN W. BEACH, OF GEORGETOWN STATION, NEW YORK.

COMBINED RINSER AND STERILIZER.

972,746.  Specification of Letters Patent.  Patented Oct. 11, 1910.

Application filed June 10, 1910. Serial No. 566,234.

*To all whom it may concern:*

Be it known that I, BENJAMIN W. BEACH, a citizen of the United States, residing at Georgetown Station, in the county of Madison and State of New York, have invented new and useful Improvements in Combined Rinsers and Sterilizers, of which the following is a specification.

This invention relates to rinsers and sterilizers and more particularly to that class of devices which are adapted for rinsing and sterilizing milk cans.

The object of the invention is to provide a strong, and durable rinser and sterilizer which may be cheaply constructed and which is convenient and easily operated.

A further object of the invention is the employment of fluid containing means which balance the can supporting table.

Further objects of the invention will appear as the following specific description is read in connection with the accompanying drawings which form a part of this application, and in which:

Figure 1 is a side elevation. Fig. 2 is a top plan view. Fig. 3 is a detail vertical section on the line 3—3 of Fig. 2. Fig. 4 is a vertical transverse section on the line 4—4 of Fig. 2.

Referring more particularly to the drawings 1 represents a supporting plate which is adapted to be secured upon a vertical support and which is provided with the table 2 formed integrally therewith and braced by the brackets 3 and 4. Mounted upon the upper side of the table is an elongated bearing rib 5 which has extending laterally therefrom wings 6 having the bevel faced stops 7 arranged at their outer ends. The can supporting table 8 has formed integral therewith the bearing lugs 9 which are arranged to fit over the ends of the bearing rib 5 and have apertures 10 which correspond with a central bearing aperture in the rib so as to receive the pivoting pin 11 which is passed through the lugs and the rib and is keyed to the former by spring teeth 12. This key causes the pin to rotate in the rib and holds it stationary with the lugs 9.

Mounted upon the underside of the table 2 are water and steam valves 13 and 14 which have their stems projecting upwardly through threaded nipples on the valves and through apertures 14 in the table. Suitable packing nuts 15 threaded upon the nipples support the valves in position with their stems 13 in alinement with downwardly projecting studs 16 depending from and formed integrally with the table 8. The valves 13 and 14 are connected to their respective sources of supply by pipes 17 and 18 and the opposite ends of the valves are connected to spring nozzles 19 and 20 which project through apertures 21 in the table 2 and are arranged coincident with apertures 22 in the table 8. The valves are spring pressed with their seats in the valve casings by springs 23 which normally keep the stems 13 in engagement with the studs 16 and hold the table 8 in balanced horizontal position.

In the operation of the device, a milk can is inverted upon the table over the apertures 22 and tilted to one direction or the other to operate either the water controlling or steam controlling valves. The can is tilted first to one direction preferably to secure proper rinsing and then is tilted to the opposite direction to open the steam valve whereby the can is properly sterilized.

It will be seen from the construction illustrated that a very durable and substantial structure is provided and that the pivot pin of the table 8 is mounted in a relatively long bearing whereby its longevity is assured.

The valves and the spring nozzles which are attached thereto may be removed by disconnecting the nuts 15 from the nipples and as these are the only parts which become worn it will be seen that I have provided convenient means whereby they may be removed for replacement.

I shall use the term table in the claims to refer particularly to the can supporting member 8 and the work bracket will refer to the supporting member 1, the table 2 and the bracket arms 3 and 4. The definition of these words should therefore include the parts mentioned.

Having thus described the invention, what is claimed is—

1. The combination with a supporting bracket, of fluid controlling valves carried thereby, a can supporting table pivoted on the bracket and adapted to operate the valves in either direction of its movement, and means adapted to normally close the valves and balance the table.

2. The combination with a supporting bracket, of fluid controlling valves carried thereby, a can supporting table pivoted on the bracket and adapted to operate the valves in either direction of its movement, means to normally close the valves and to balance the table, and means to limit the movement of the table in either direction.

3. The combination with a supporting bracket, of fluid controlling means removably supported thereon, a can table pivoted upon the bracket and having apertures therein, and spraying nozzles carried by the fluid controlling means and arranged coincident with the apertures.

4. The combination with a supporting bracket, of spring operated valves carried thereby, a can table pivoted to the bracket and having apertures therein, spraying nozzles carried by the valve and arranged coincident with the apertures, and valve stems engaging the table to hold the same balanced.

5. The combination with a supporting bracket, of a can table pivoted thereto, valves carried by the bracket, and valve stems projecting through the bracket and engaging the table for holding the table in horizontal position.

6. The combination with a supporting bracket, of a can table pivoted thereto, valves carried by the bracket on either side of the pivotal point of the table, spring-pressed valve stems projecting through the bracket, and means carried by the table for operating the valve stems.

7. The combination with a supporting bracket, of a can table pivoted thereto, valves carried by the bracket on either side of the pivotal point of the table, spring-pressed valve stems projecting through the bracket, means carried by the table for operating the valve stems, and means carried by the bracket for limiting the movement of the table.

In testimony whereof I affix my signature in presence of two witnesses.

BENJAMIN W. BEACH.

Witnesses:
　DAVID M. NEWITT,
　RUFUS J. MOODY.